June 17, 1969

J. B. KRAELING 3,450,243

EXTERNAL DISCONNECT FOR SPEED CHANGER CLUTCH

Filed Feb. 23, 1967

INVENTOR.
JOHN B. KRAELING
BY
CAROTHERS & CAROTHERS
HIS ATTORNEYS

United States Patent Office 3,450,243
Patented June 17, 1969

3,450,243
EXTERNAL DISCONNECT FOR SPEED CHANGER CLUTCH
John B. Kraeling, Meadville, Pa., assignor to Drafto Corporation, a corporation of Pennsylvania
Filed Feb. 23, 1967, Ser. No. 618,015
Int. Cl. F16d 19/00, 21/00, 23/00
U.S. Cl. 192—97                          11 Claims

ABSTRACT OF THE DISCLOSURE

The art of hoist line implements including a traveling block motorized to open and close hook jaws and to rotate a hook from which the load is suspended, through interrelated power delivery speed changer and clutch wherein the clutch is operable externally to open the power delivery and manually operate the hook jaws or swing the hook to turn the load.

References 3,037,804, Kraeling et al. June 5, 1962, 294–82;
3,251,590, Kraeling, May 17, 1966, 261–1.

Background of invention

This invention relates generally to a hoist line traveling block containing a motorized output shaft to produce an additional function in relation to the load handled thereby. If the traveling block carries a hook from which a load is suspended the motorized output shaft may turn the load in transit to properly deposit the same. If the traveling block carries a pair of horizontal tongs operable in opposite directions, or a horizontal hook bar, both of which require horizontal movement to be inserted in or under the load to raise the same, such movement is performed by the motorized output shaft in the traveling block. If the traveling block carries a weighing device and it is desirable to raise the stop to vary or change the maximum weight, the stop may be changed in elevation by using a wedge slide over the stop to remove the weight from the load cell.

Each of these uses are of particular importance because the traveling block which carries the motorized speed changer clutch to operate the mechanism may have severed the current supply or control cable thereto. This leaves the crane useless. One cannot free the locked motorized speed changer. It is necessary to shut down the crane to open the traveling block to repair or replace the motor, the supply or control electric cable or whatever is out of service. To shut down a crane in a shop when it is badly needed for at least until the end of the shift, steel pour, or mill run may prove to be disastrous and very costly. This is particularly true when such functions were previously performed manually.

Summary

It is important to be enabled to release this function output shaft to make it free wheeling and enable the hook or load to be turned manually, or move the horizontal tongs or bars into or under the load and to enable the hook on to either release or insert the weighing cell in the traveling block to prevent service interruption.

The principal object of this invention is the provision of external manual means to release the clutch between the speed changer and the output shaft to disconnect the latter and provide free wheeling action of the same. This permits continued operation of the speed changer without the loss of time. This speed changer may have different applications. Regardless of the application the speed changer is enclosed and the external disconnect for the clutch permits quick release of the clutch to render the output shaft in a free wheeling condition.

The clutch release comprising this invention provides only one bolt to be released to render the output shaft free wheeling. This bolt may be retained by the clutch part as in the instance of a dent type clutch. This bolt may be retained by a bolt lock in the output shaft when the dent clutch is released or when the plates of a friction clutch have been released. Thus in each instance the releasing bolt becomes the retainer of the clutch part.

In one form the external disconnect bolt is retained by the clutch part. In the other form the external disconnect bolt is locked to the output shaft to prevent the removal of the clutch part and the bolt.

Other objects and advantages appear in the following description and claims.

The accompanying drawings show, for the purpose of exemplification without limiting the invention or claims thereto, certain practical embodiments illustrating the principles of this invention wherein:

Figure 1:
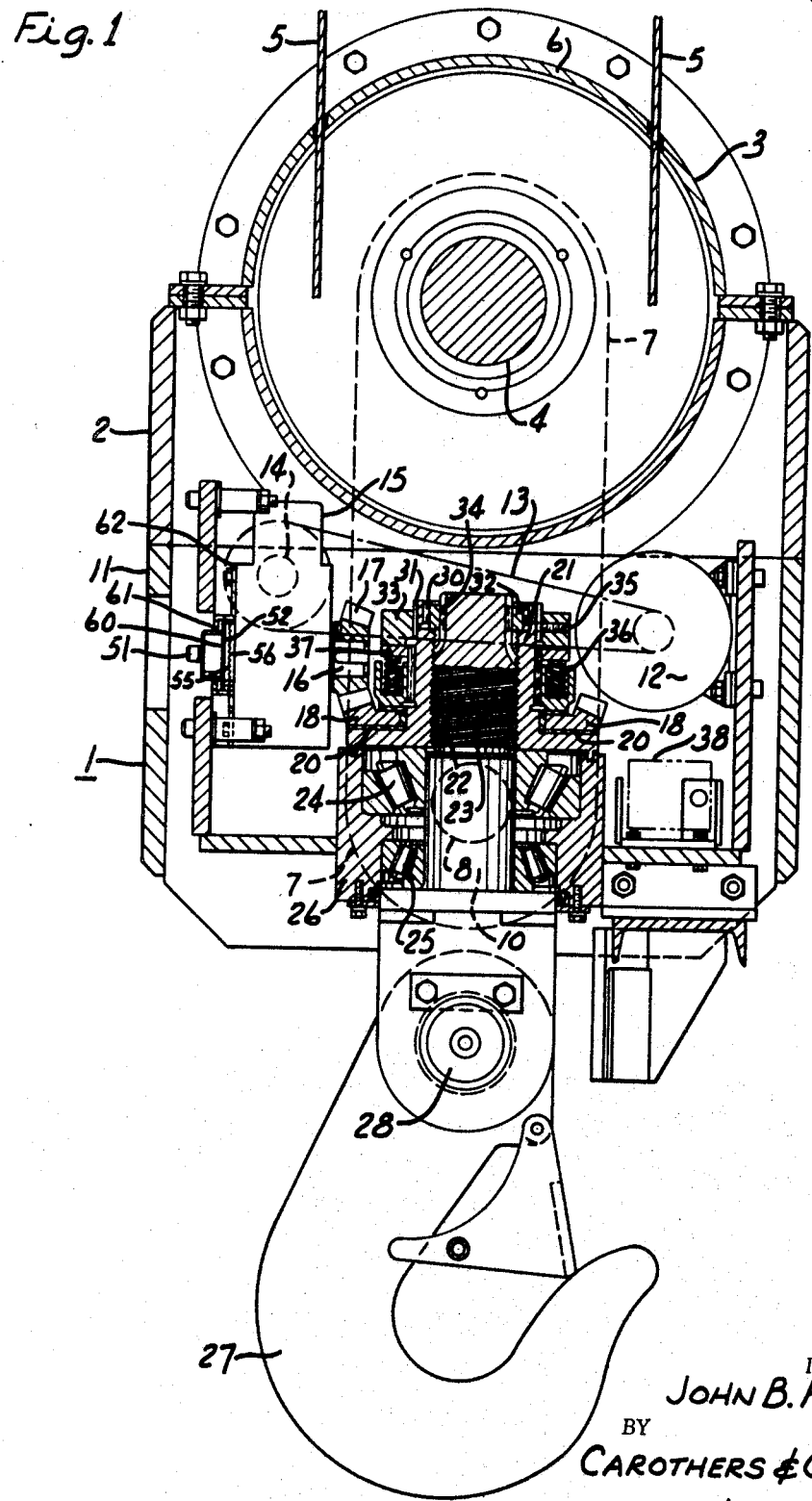
FIG. 1 is a view in vertical section of a traveling block comprising this invention.

Referring to FIG. 1 of the drawings, the traveling block 1 is made up of two sections, the upper section 2 comprising the sheave housing wherein the sheaves 3 are rotatably supported on the sheave pin 4. Each sheave is carried by anti-frictional bearings on the sheave pin and provided with spacers to maintain their proper space relationship along the pin and between the outer sheaves and the upper housing section 2. A cable 5 is woven between the sheaves of the crane or crown block and the sheaves of the traveling block 1 by passing through aligned slots in the top section 6 of the upper sheave housing 2.

The outside of the housing section 2 is provided with link 7 which slips over the ends of the sheave pin 4 and depends in engagement with the sides of the traveling block housing 1 to the trunnions 8 on the trunnion block 10 which protrude through the side walls of the lower housing section 11 which retains the rotary motor 12 connected by suitable flexible drive belt 13 to the pulley on the input shaft 14 of the speed changer 15. The output shaft 16 of the speed changer 15 carries the pinion 17 for meshing with the proper gear such as the beveled gear 18 journaled on clutch lining 20 seated on the shoulder and axial portion of the nut 21 that is internally threaded as at 22 on the threaded portion of the spindle 23 journaled in the tapered roller bearings 24 and 25 which are in turn supported by the bearing block 26 that receives the trunnions 8 to support the lower housing section 11 and which pass through the lower aligned holes in the link 7 for the purpose of transmitting the load from the hook 27 through the link 7 to the hoist lines 5. The hook 27 is in turn supported by the hook pin 28 which in turn is journaled in the lower end of the spindle 23.

The nut 21 is screwed on the upper threaded end of the spindle 23 and the upper cylindrical portion of the nut is provided with inner and outed axial spline sections 30 and 31 which respectively engage the spline collar 32 and the clutch spring adjustment collar 33. The inner axial spline 30 engages the outer spline on the collar 32 and the inner spline of the collar 32 engages the spline on the outer end 34 of the upper end of the spindle 23. Thus the spindle is directly splined to the nut 21.

The clutch adjustment collar 33 is pinned to the spline connection by the set screws 35 after the same has been forced downwardly to compress the clutch springs 36 by the pressure ring 37 which also engages one of the clutch lining sections 20 that engages the upper face of the beveled ring gear 18. Thus the springs 36 create sufficient friction between the nut 21 and beveled gear 18 to permit the nut to slip under this frictional clutch engagement when the heavy load carried by the hook strikes an immovable abutment. The clutch springs are adjusted to prevent the load from stripping the gear in the speed changer 15.

A suitable rectifier 38 may be provided in the housing for the purpose of operating the reversible motor 12 which is preferably a DC motor with alternating current supplied to the rectifier. Thus by reversing the direction of the field current in the DC motor 12, the spindle 23 may be operated in either direction by reversing the direction of rotation of the input and output shafts 14 and 16, respectively, for the speed changer 15.

Figure 3:
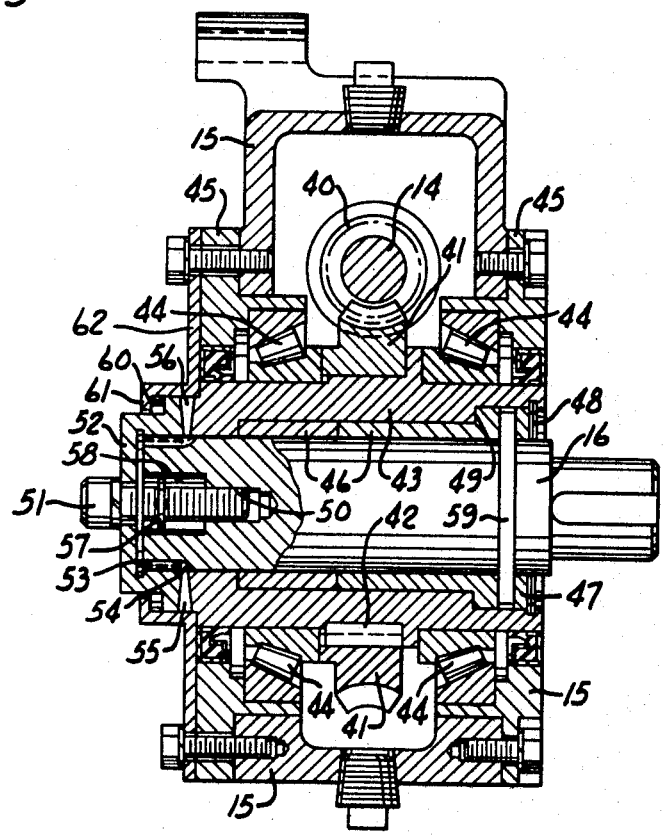
FIG. 3 is an enlarged sectional view of a speed changer dent clutch disconnect.

As shown in FIGS. 1 and 3, the speed changer 15 has a worm 40 secured to the input shaft 14 and in mesh with the worm gear 41 for the purpose of reducing the speed through this speed changer by reducing the speed of rotation of the worm gear 41. The worm gear 41 is keyed at 42 to the sleeve 43 journaled on the tapered roller bearings 44 carried by the housing inserts 45 on each side of the speed changer housing. Proper oil seals are provided between the sleeve 43 and the bore of these housings to prevent the escape of a liquid contained within the worm gear housing which contains a lubricant that may be inserted and drained in the respective plugs as shown in FIG. 3.

The output shaft 16 of the speed changer 15 is shown to be provided with a fixed shoulder 59 which engages the one end of the sleeve bearings 46, a portion of which is stepped in the bore of the sleeve 43 at the output end of the shaft 16. A suitable retaining ring 47 and a split ring 48 retain the output shaft 16 in the sleeve 43.

At the opposite end of the output shaft 16 a threaded bore 50 is provided to receive the threaded end of a bolt 51 having a socket type head and clamping on a lock washer seated on the outer face of the clutch plate 52. This clutch plate is provided with two sets of splines, a radial set of splines 53 which engage corresponding splines 54 on the opposite end of the output shaft 16. The clutch plate 52 is hat-shaped and the under face of the brim of the hat is provided with an annular seat of radial spline teeth 55 which mesh with the spline teeth 56 on the end of the sleeve 43. A washer 57 is secured to the stem of the bolt 51 and that resides in the clearance bore 58 within the end of the output shaft 16 and when the bolt 51 is unscrewed from the threaded bore 50 the washer 57 will engage the inner face of the clutch plate 52 and withdraw the radial and tapered spline teeth 55 from the spline teeth 56 thereby disconnecting the sleeve 43 from the output shaft 16. The spline teeth 53 and 54 between the clutch plate 52 and the output shaft 16 are displaced, but nevertheless remain in splined connection with each other.

As the bolt 51 is screwed outwardly to lift the clutch plate and open its dent teeth in the form of the radial spline teeth 55 and 56, it will continue until the shoulder 60 of the clutch plate engages the inner face of the flange 61 of the retainer plate 62 secured to the housing of the speed changer. Thus when the bolt 51 is withdrawn as far as it can go, the output shaft 16 is free or has the property of free wheeling, and when as disclosed in FIG. 1 the bolt 51 is withdrawn to open the clutch plate 52 the teeth 55 disengage from the teeth 56 and induce free wheeling of the hook spindle 23 as shown in FIG. 1. When this speed changer is thus disconnected by the externally exposed bolt 51, the speed changer is then coupled providing free wheeling action of the spindle 23 and the hook 27 suspended therefrom. This permits one to turn the hook by hand or by the use of a long poker to turn a load suspended on the hook. Thus, if anything happens to the electric motor or the lines connected thereto for supplying power and control thereof preventing the operation of the motor to rotate the hook, one need only to lower the traveling block and unscrew the bolt 51 as far as it will go to provide a free wheeling action of the hook and thus continue to use the crane hook until an opportune downtime may be taken to replace the motor in operation and without loss of the use of the traveling block and crane hook.

Figure 4:
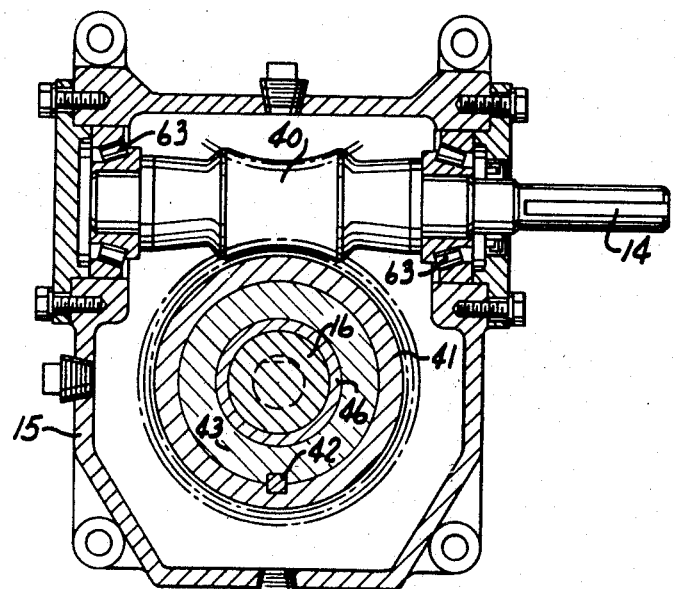
FIG. 4 is a sectional view of a speed changer showing the input shaft.

Referring to FIG. 4, the input shaft 14 is supported by roller bearing 63 with the worm 40 in mesh with the worm gear 41 secured to the sleeve 43 by the key 42 and carrying in its bore the sleeve bearing 46.

The speed changer 15 is provided with suitable plugs for insertion or drainage of a lubricant and the input shaft is properly sealed to prevent escape of lubricant therefrom.

Figure 5:
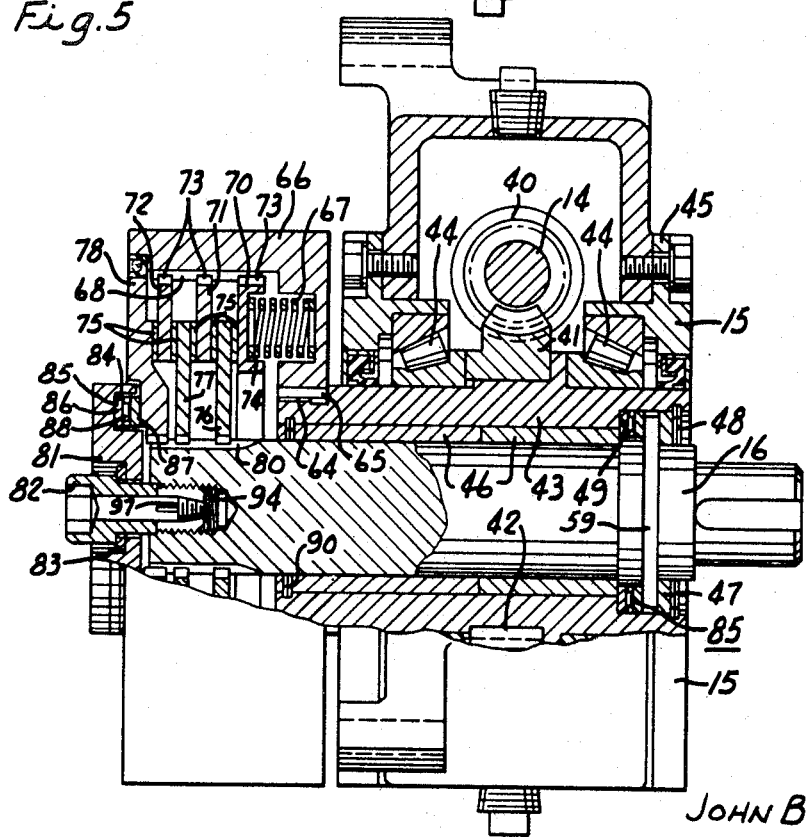
FIG. 5 is an enlarged sectional view of a speed changer frictional clutch disconnect with a short locking plug removed.

Referring now to FIG. 5, which discloses a modification of the clutch assembly of the speed changer 15, the housing of the input shaft 14 together with its worm 40 meshes with the worm gear 41 by the key 42 to the sleeve 43 and is the same structure as that disclosed in FIG. 3 and only those parts which are different are described.

Where the sleeve 43 extends from the housing of the speed changer 15, it is provided with an exterior spline section 64 and meshes with a complementary spline section 65 of the end clutch plate and housing 66 which contains the clutch springs 67 spaced annularly therearound and which is provided wih an outwardly extending cylindrical wall that forms the housing of the multiple disc clutch. The inner cylindrical face of the clutch housing 66 is provided with a series of inwardly extending radial keys or splines 68 on which is movably mounted the three driving clutch plates 70, 71 and 72 that have corresponding key or spline connections 73 that are complementary to those of 68. The first clutch plate 70 is provided with opposed sockets 74 to receive the opposite end of the springs 67. The face of the driving clutch plate 70 opposite to that which carries the socket 74 for the springs 67 is a friction face and it engages the clutch lining 75 secured to the output shaft clutch plate 76 which has a lining 75 on opposite sides thereof. In like manner, the output shaft clutch plate 77 is also provided with clutch lining 75 on each side thereof. The outer output shaft clutch plate 78 also carries a clutch lining 75. Thus each of the driving clutch plates 70, 71 and 72 and their clutch surfaces in frictional engagement with the clutch lining 75 is carried by each of the driven clutch plates to permit the heat transference to be conducted to the clutch housing 66 which represents the greatest exposure to the air for dissipation of heat. Each of the driven clutch plates 76, 77 and 78 are provided with mating engagement with the spline or key connectons 80 formed integral with the end of the output shaft 16. A clutch pressure plate 81 is held in place by the clutch adjusting and locking bolt 82 that threadably engages a threaded bore in the axial center of the shaft 16. The head of the cap screw or bolt 82 clamps upon a lock washer 83 in a socket concentric in the pressure plate 81. The pressure plate is also provided with an annular groove 84 to receive the anti-friction thrust bearing 85 made up of race plates 86 and 87 between which is mounted a cage with a series of anti-frictioned rollers indicated at 88. A similar thrust bearing 85 is shown at the opposite end of the output shaft 16 and is mounted to seat against the shoulder 49 in the bore of the sleeve 43 and also forms a stop for the sleeve bearings 46. The opposite end of the sleeve bearings 46 is held in place by the split retainer ring 90. However, the pressure of the thrust bearing 85 is received by the sleeve and its opposite side is engaged by the flange 59 of the output shaft, the other side of which is provided with the ring 47 and the retainer split ring 48, the same as that shown in FIG. 3.

Figure 6:
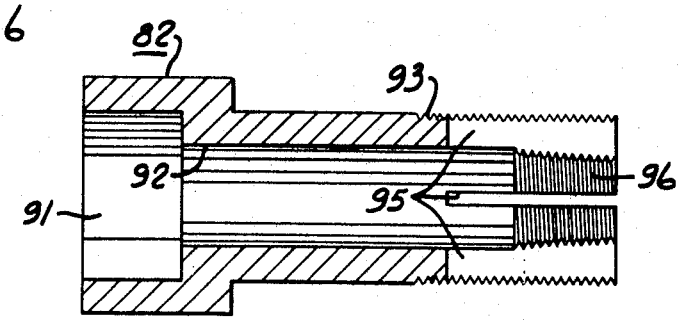
FIG. 6 is an enlarged sectional view of the pressure adjusting and locking bolt.

The cap screw or bolt 82 is shown in FIG. 6 wherein it is provided with a socket having a non-round bore as illustrated at 91 and is concentric to the bore 92 through the screw 82. The outer portion of the bolt is threaded at 93 to mesh with the complementary thread in the bore 94 in the output shaft. The threaded end of the stem of the bolt or cap screw 82 is preferably slit at the cardinal points as indicated at 95, and adjacent the outer end of the bolt stem the bore 92 is tapered as indicated at 96 and is threaded to receive the complementary threads on the plug 97 of FIG. 8 that is also provided with a wrench type socket head. When the plug 97 is inserted in the bore 92 and slid to the end thereof wherein its tapered threads engage the tapered threads 96 and is extended to tighten the threads in the tapered threaded bore, the fingers formed by the transverse slots 95 expand the fingers tightly against the threaded bore 94 and cause the bolt to be firmly locked in any desired position.

Thus when the cap screw or bolt 82 is itself tightened in the threaded bore 94 to compress the clutch springs 67 by exerting an axial force against the outer driven clutch plate 78 and increase the frictional engagement between each of the clutch plates to compress the springs 67 to a degree wherein the friction between the plates is greater than that required to drive the output shaft 16, the input delivered to the shaft 14 passes through the speed changer to the output shaft 16 as though it were a direct drive unit. The cap screw or bolt 82 may than be locked in position by the tapered threaded plug 97 and the expanding collet locking device will prevent the clutch 67 from slipping. As shown in FIG. 1 the clutch mechanism on the hook nut 21 operating through the clutch lining sections 20 will always allow slippage at this position of the train rather than to break any of the parts in the rest of the power train when a load suspended from the hook strikes an immovable object.

If, however, for some reason the motor 12 or its controls are severed or the power thereto is lost, one need only to loosen the locking plug 97 and withdraw the cap screw bolt to a position where the driven plates are in free non-frictional engagement with their driving clutch plates. At this position the locking plug 97 is again secured to hold the clutch in this position. The hook 27 may be freely turned by hand or what is considered to be in a free wheeling position, to enable the traveling block and the hook to be employed until a proper time for shutting down the crane to permit repair or replacement of the motor 12 and its control parts.

Figure 8:
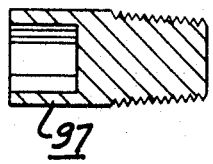
FIG. 8 is an enlarged view of a short locking plug.
Figure 9:
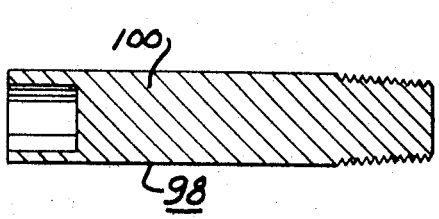
FIG. 9 is an enlarged view of a long locking plug.

As shown in FIG. 8, the locking plug 97 is a short plug and its non-round socket has to be reached by the long end of a wrench. However, as shown in FIG. 9, the plug performs the same function as that of the plug 97 but has a long stem 100 with a socket at its outer end, which socket would be positioned below the socket 91 illustrated in FIG. 6. This structure is shown in FIG. 7 and the socket of the plug 98 is below the socket 91 of the cap screw or bolt 82.

Figure 7:
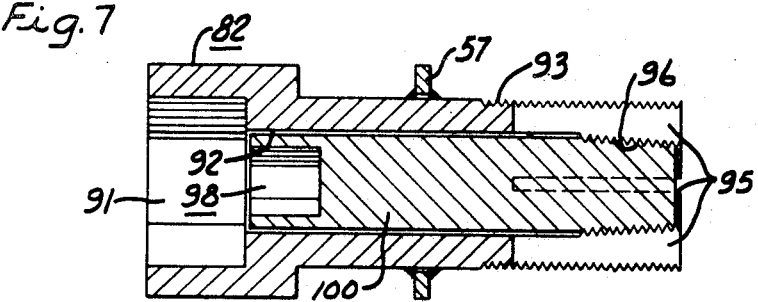
FIG. 7 is an enlarged sectional view of the pressure adjusting and locking bolt carrying an abutment.

As shown in FIG. 7, the cap screw 82 is provided with a washer member 57 which is employed in the structure as shown in FIG. 3. Thus the lock plugs 97 and 98 may be employed in combination with the cap screw 82 for holding the clutch plate 52 in FIG. 3 with the lateral dent clutch members 55 and 56 in spaced relation and out of engagement with each other. Thus this type of structure shown in FIG. 7 may be employed and the retained plate 62 shown in FIG. 3 may be eliminated because the cap screw or bolt will hold the clutch parts in engagement or out of engagement merely by locking the adjusting cap screw bolt 82 in the structure of FIG. 3.

Figure 10:
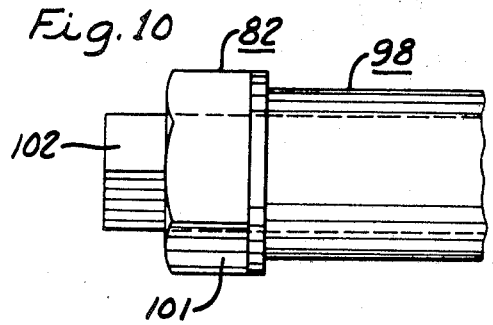
FIG. 10 is an enlarged sectional view of a locking bolt and plug having a machine type head.

FIG. 10 illustrates a structure wherein the bolt 82 may be an ordinary non-round external head as illustrated at 101 and the locking plug 98 may have a squared end 102 that extends beyond the bolt head 101 for the purpose of locking the clutch operating and adjusting bolt 82 in any desired position whether it be in the structures as shown in FIG. 3 or 5.

Figure 2:
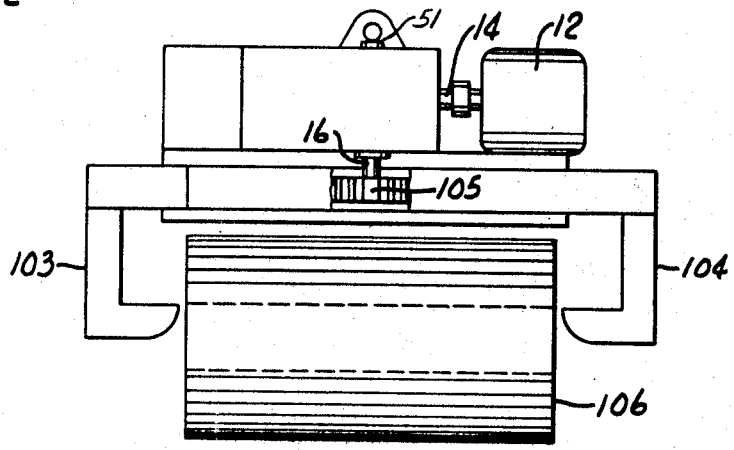
FIG. 2 is a view in vertical section of a motorized pair of lift tongs.

In the structure shown in FIG. 2 the external disconnect for the speed changer clutch is employed with a horizontal tong for driving a pair of horizontal tongs which when carried by the traveling block are open to allow the ends of the tongs to be spaced a distance greater than a coil of steel 106 and when the motor 12 is actuated the tongs 103 and 104 are driven in opposite directions by the spur gear 105 on the output shaft 16 for the purpose of retracting and then inserting the tongs into the coil for the purpose of raising the coil to transport the same to another location when suspended from a crane. The structure in FIG. 2 is the same as that shown in the other views and the selection of the type of clutch, whether it be a dent clutch as shown in FIGS. 1 and 3 or a friction plate clutch as shown in FIG. 5, is merely one of selection. This illustrates the use of this external disconnect for a speed changer clutch which does not necessarily have to be mounted in a traveling block, but the problem in a traveling block is better used for the purpose of illustrating this invention. It is obvious that the invention could be applied to most any remote control actuated member that provides a speed changer. One simple application might be an electrically operated door, which, if the remote control cannot be operated, the door may be readily freed from the mechanical operation and permit the same to be operated manually.

I claim:

1. An external clutch disconnect between a source of rotary power and a load, including an inner housing enclosing and rotatably supporting an input shaft and an output shaft, each with one end projecting from said housing for driving connections, one shaft having its other end exposed through said housing, a rotary sleeve journaled on said one shaft and driven by said other shaft, a clutch enclosed by said housing interposed between said sleeve and said one shaft, an outer housing surrounding said inner housing, a clutch actuation bolt having its head exposed by an opening in said outer housing and engaged in the axial center of said one shaft and engaging said clutch for closing and releasing the same, and means for retaining and locking said bolt to prevent accidental shifting and removal of said clutch from said shaft.

2. The external clutch disconnect of claim 1 characterized in that said clutch is an annular dent clutch having an end wall opening receiving the stem of said bolt.

3. The external clutch disconnect of claim 2 characterized by shoulder on the stem of said bolt to engage said dent clutch to withdraw the same when said bolt is moved outwardly of said one shaft, and retainer plate extending around said exposed bolt head and providing limited outward movement of said dent clutch.

4. The external clutch disconnect of claim 2 characterized by said output shaft in said one shaft and having a sleeve bearing stepped in a bore of said rotary sleeve, a shoulder on said output shaft to engage and draw up said sleeve bearing and fully engage said dent clutch held by said bolt when tightened and when said bolt is loosened to disconnect said dent clutch and release said output shaft to free wheeling in said sleeve bearing.

5. The external clutch disconnect of claim 1 characterized in that said clutch is a friction clutch having an end plate with an opening to receive said bolt stem.

6. The external clutch disconnect of claim 5 characterized by an expansible lock collet on the end of said bolt, a bore through said bolt with a tapered thread in the collet section thereof, and a tapered threaded plug operable through said bolt bore to expand said lock collet at selected axial positions to apply and release said friction clutch and to measure the frictional load transmission of said friction clutch.

7. The external clutch disconnect of claim 5 characterized in that said friction clutch has multiple friction discs pressure biased by a series of springs to permit the frictional release of said output shaft and to vary the frictional load transmitted by a locking means on said bolt when fixed in different axial positions in said output shaft, representing different frictional loads transmitted by said clutch.

8. The external clutch disconnect of claim 1 characterized by an expansible lock collet on the end of said bolt, a bore through said bolt with a tapered thread in the collet section thereof, and a tapered threaded plug operable through said bolt bore to expand said lock collet at selected axial positions to apply and release said clutch.

9. The external clutch disconnect of claim 8 characterized in that said clutch is a dent clutch.

10. The external clutch disconnect of claim 1 characterized by speed changer gear means between said input and output shafts.

11. The external clutch disconnect of claim 1 characterized in that said outer housing encloses a traveling block with a rotary hook, a motor in said traveling block connected to drive said input shaft, and said output shaft connected to rotate said hook as said head.

References Cited

UNITED STATES PATENTS

| | | | |
|---|---|---|---|
| 2,360,887 | 10/1944 | Parker | 64—30 X |
| 2,540,997 | 2/1951 | Schmitter | 64—30 X |
| 2,586,530 | 2/1952 | Godfrey | 64—30 X |
| 2,635,727 | 4/1953 | Bitler | 192—20 X |
| 2,726,524 | 12/1955 | Gorin | 64—30 |
| 2,727,372 | 12/1955 | Haerther. | |
| 3,337,245 | 8/1967 | Prange | 192—67 X |

BENJAMIN W. WYCHE III, *Primary Examiner.*

U.S. Cl. X.R.

64—9, 30; 85—79; 192—20, 70.13; 248—329